United States Patent [19]

Beryozkin et al.

[11] Patent Number: 5,504,969
[45] Date of Patent: Apr. 9, 1996

[54] SELF-PROPELLED MACHINE FOR CLEANING AND DISINFECTING TRANSPORTATION VEHICLES

[76] Inventors: Vladimir Beryozkin, 3 Stephen Ct., New City, N.Y. 10956; Alexander Rudshteyn, 2060 Ocean Ave., #6A, Brooklyn, N.Y. 11235

[21] Appl. No.: 314,784

[22] Filed: Sep. 29, 1994

[51] Int. Cl.$^6$ .................. A47L 11/282; A47L 11/283; A47L 11/30
[52] U.S. Cl. .................. 15/320; 15/4; 15/49.1; 15/50.3; 15/87; 15/340.2; 15/340.4; 15/21.1
[58] Field of Search .......... 15/320, 321, 340.1, 15/340.3, 340.4, 383, 49.1, 50.1, 50.3, 52.1, 52.2, 98, 4, 87, 340.2

[56] References Cited

U.S. PATENT DOCUMENTS

| | | | |
|---|---|---|---|
| 1,901,647 | 3/1933 | Howald et al. | 15/21.1 |
| 3,402,420 | 9/1968 | Schaeffer | 15/321 |
| 4,163,302 | 8/1979 | Iaboni | 15/50.1 |
| 4,167,798 | 9/1979 | Klugl et al. | 15/321 |

Primary Examiner—Edward L. Roberts, Jr.
Attorney, Agent, or Firm—Ilya Zborovsky

[57] ABSTRACT

A machine for cleaning and disinfecting transportation vehicles comprises a frame provided with a plurality of wheels, electric motor means for driving the wheels and therefore moving the machine in a predetermined direction, a device for washing and cleaning a central area of the floor and under side seats of a transportation vehicle to be cleaned, and a device for washing and cleaning walls, seats and a ceiling of the transportation vehicle. The device for washing and cleaning the floor includes a unit for washing and cleaning a central area of the floor and a unit for washing and cleaning areas under the seats of the transportation vehicle, the device for washing and cleaning walls, seats, and ceiling being provided with lever elements movable between a plurality of positions suitable for correspondingly cleaning the walls, the seats and the ceiling of the transportation vehicle.

5 Claims, 2 Drawing Sheets

SELF-PROPELLED MACHINE FOR CLEANING AND DISINFECTING TRANSPORTATION VEHICLES

BACKGROUND OF THE INVENTION

The present invention relates to machines for cleaning and disinfecting the interior of transportation vehicles, such as for example, railroad passenger cars and the like. The machine of the present invention can be used for cleaning, eliminating graffiti and disinfecting the interior of tractor trailers, railroad refrigeration cars, interior of railroad stations, office building interiors, etc.

Devices of the above mentioned general type are known in the art. One of such devices is used for washing and disinfecting interior of trailers or vans and disclosed in U.S. Pat. No. 3,897,263, while another device is an internal cleaner for truck trailers and bodies and disclosed in U.S. Pat. No. 4,106,516. U.S. Pat. No. 4,429,433 discloses a surface cleaning machine with squeegee assembly, U.S. Pat. No. 4,577,364 deals with a floor cleaning machine, and U.S. Pat. No. 4,624,026 discloses a surface maintenance machine with a rotary flip. The above mentioned devices are used for cleaning tractor trailer-refrigerators or for cleaning floors of the buildings. The devices for washing and disinfecting the interior of trailers and vans are stationary and based on vertically extending mounting structure which is fixed at one end and a boom secured at the other end of the mounting structure, extending in horizontal direction and movable vertically and also turnable between a plurality of angles. This apparatus also has a pressurized washing liquid and a rotatable washing head. The devices for cleaning floors of horizontal surfaces are based on external electric power used for propulsion of a frame with wheels and tanks with cleaning the recovered solutions as well as squeegee assembly with the blades. The operator in this case usually walks behind the machine or sits on it.

The above mentioned devices cannot be used however for cleaning and eliminating graffiti, disinfecting an interior of such transportation vehicles as railroad cars due to high requirements for machine maneuverability, required small dimensions, availability autonomous sources of power, efficiency, availability of very limited space for machine operation and demands to clean not only floors but also seats, walls, ceiling and cover windows of the vehicle interior lighting fixtures. A machine for such application has to be battery powered, autonomous, capable of doing efficient work in a very limited time, capable of carrying and providing safe and comfortable position for the operator, and also should not be bulky, large or long and must be highly maneuverable.

Maintaining of daily cleanness in the interior of the railroad cars, especially subway cars in big cities, is a mammoth and expensive task. However, presently there are no machines which can satisfy the above specified requirements.

SUMMARY OF THE INVENTION

Accordingly, it is an object of the present invention to provide a machine for cleaning and disinfecting transportation vehicles, which avoids the disadvantages of the prior art.

More particularly, it is also an object of the present invention to provide a machine of the above mentioned type which is mobile, highly efficient and maneuverable, compact and has an autonomous source of electric power, and which is also capable of working in a very limited space, cleaning floors, seats, walls, ceilings, and cover windows of lighting fixtures in the short period of time and providing safe and comfortable position for the operator.

In keeping with these objects and with others which will become apparent hereinafter, one feature of the present invention resides, briefly stated, in a self-propelled, electrically powered, multi-wheeled autonomous and compact machine for cleaning the interior of transportation vehicles, which has a frame, a propulsion system, pneumatic wheels, a system for cleaning floor, walls, ceiling, operation and control systems, operator's platform, tanks for storing necessary cleaning and soiled liquid and basket for picked-up objects, compressed air supply reservoir and power supplies for propulsion, operation and control mechanisms and systems.

When the device is designed in accordance with the present invention, it eliminates the disadvantages of the prior art and provides for the above mentioned highly advantageous results.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
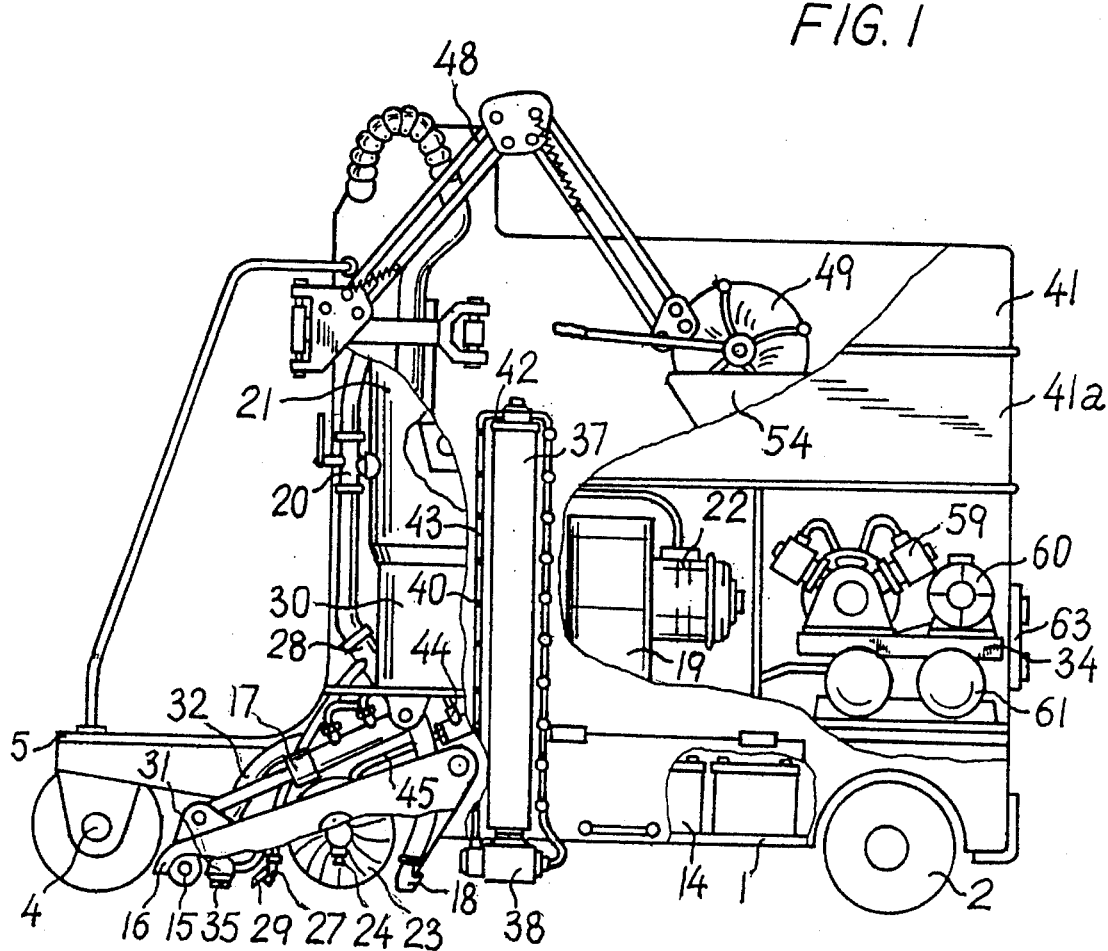
FIG. 1 is a side view of a machine for cleaning and disinfecting transportation vehicles in accordance with the present invention.
Figure 2:
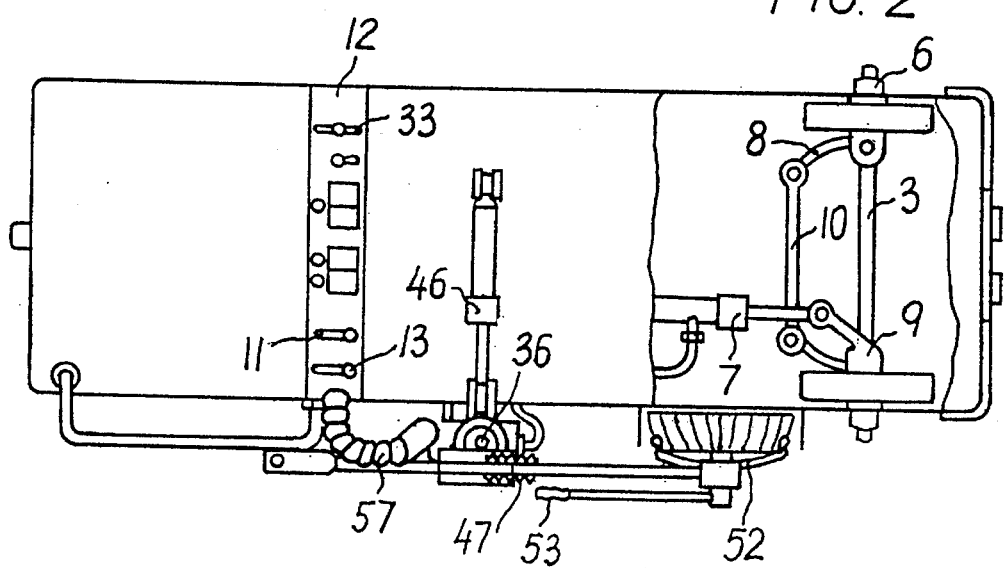
FIG. 2 is a plan view of the inventive machine in accordance with a further embodiment of the invention.

A machine for cleaning and disinfecting transportation vehicles is a self-propelled, electrically covered, multi-wheeled, autonomous and compact machine and is disclosed in the drawings. The machine has a sectionalized frame 1 which is supported by three pneumatic wheels 2 attached to a large front axle 3 and small rear axle 4. It provides base for mounting of other equipment. In order to increase its maneuverability, the machine has two wheels located at the front end and one wheel located at the rear end. The rear part of the frame 1 has a platform 5 for an operator.

The machine has a propulsion system with two forward speeds and one rearward speed.. The system includes two electric motors 6 connected with the front wheels 2, and a pneumatic cylinder 7 for steering the wheels. The pneumatic cylinder 7 is connected with steering arms 8 of the vehicle 2 through steering ring nickle 9 and a tie rod 10. The operation of the cylinder 7 is carried out by a handle 11 of an air distributing valve located in an operator panel 12. A controller 13 on the operator panel 12 is used for changing the speed and direction of the machine.

The machine is powered by four quickly rechargeable 6 watt DC batteries 14. It is also provided with a battery charger, resistors and drive elements for transmitting a torque of the electric motor to the front axle 3 and its wheels 2.

The machine further has an apparatus for cleaning floor, walls, ceiling and seats. The apparatus has four sections. Its one section 15 is provided for washing and cleaning the floor and located under the operator platform 5. It includes an element mounted on a light frame 16 which is liftable and lowerable by a pneumatic cylinder 17 attached to the frame. The section 15 also has a vacuum system 18 including a vacuum pump 19 for conveying dirt, connecting hoses, a distribution valve 20, a filter 21, a storage tank 41, and an electric motor 22. The vacuum pump 19 is activated by a handle of the air distributing valve 20 to convey soiled liquid or dirt to a filter system 21 and a storage tank 41. The vacuum pump 19 is driven by an electric motor 22.

The apparatus also has a system 23 for washing and drying off a wet floor. This system includes a pipe with cylindrical brushes in it and injectors 24 between the brushes. The cleaning or disinfection liquids are conveyed through the pipe to the brushes by injectors 24. An electric motor 25 provides rotation of this mechanism.

The system for drying off the wet floor is composed of two units. The first unit for cleaning and preliminarily drying off the floor is located behind a rotating cylindrical shaft 26 with pads and has a suction inlet 27 connected with a T-shaped connector 28. The connector is attached to the filter system 21 of the vacuum pump 19. A squeegee 29 is attached at the opposite side of the suction inlet 26. It can collect floor liquid pulp during the movement of the machine and then conveys the pulp to be sucked in the suction inlet 27, the filter system 21 and finally to a reservoir 30 for soiled liquid.

The second unit has a hollow cylinder 31 with a heating element in it. The cylinder 31 is connected through a hose 32 with a distributing valve 33 of a compressor system 34. Compressed air flows through the heating element to the cylinder 31, is heated up, and conveyed to the wet clean floor through an ejector 35 to dry off the floor.

A section 36 is mounted on the side of the machine and provided for washing and cleaning the small area of the floor under the passenger seats. This section has a small cylindrical shaft 37 which is similar to the shaft 26, and an electric motor 38 for driving the shaft. A system 39 for conveying the cleaning and disinfecting liquids has a pipe with injectors 40 in it. This system is connected by flexible clear plastic hoses with reservoirs 41 and 41a for cleaning and disinfecting liquids.

A unit 42 is provided for drying off a floor and has a pipe 43 with the injectors 40. The pipe 43 is connected by a flexible hose with a T-shaped connector 44 attached to a hose 45 and the cylinder 31 with the heating element in it. A pneumatic cylinder 46 is used for transferring the section 36 from a transportation or vertical position to a working or horizontal position. The cylinder is controlled by an operator from the operator's panel.

For further improvement of the machine, the machine can be also equipped with two sections 36 for washing and cleaning the floor under the passenger seats.

A mechanism 47 is provided for washing and cleaning walls, seats, and ceiling and has a balance system capable of providing three levels of movement freedom for levers 48. The levers 48 are attached to a work mechanism 49 which has a cleaning brush 49a. The rotation of the work mechanism 49 is provided by an electric motor 50. Cleaning and disinfecting liquids are conveyed to the work mechanism and brush by an injector 51 located on the periphery of a brush holder 52 of the work mechanism. The electric motor 50 drives the work mechanism in rotation.

Figure 3:
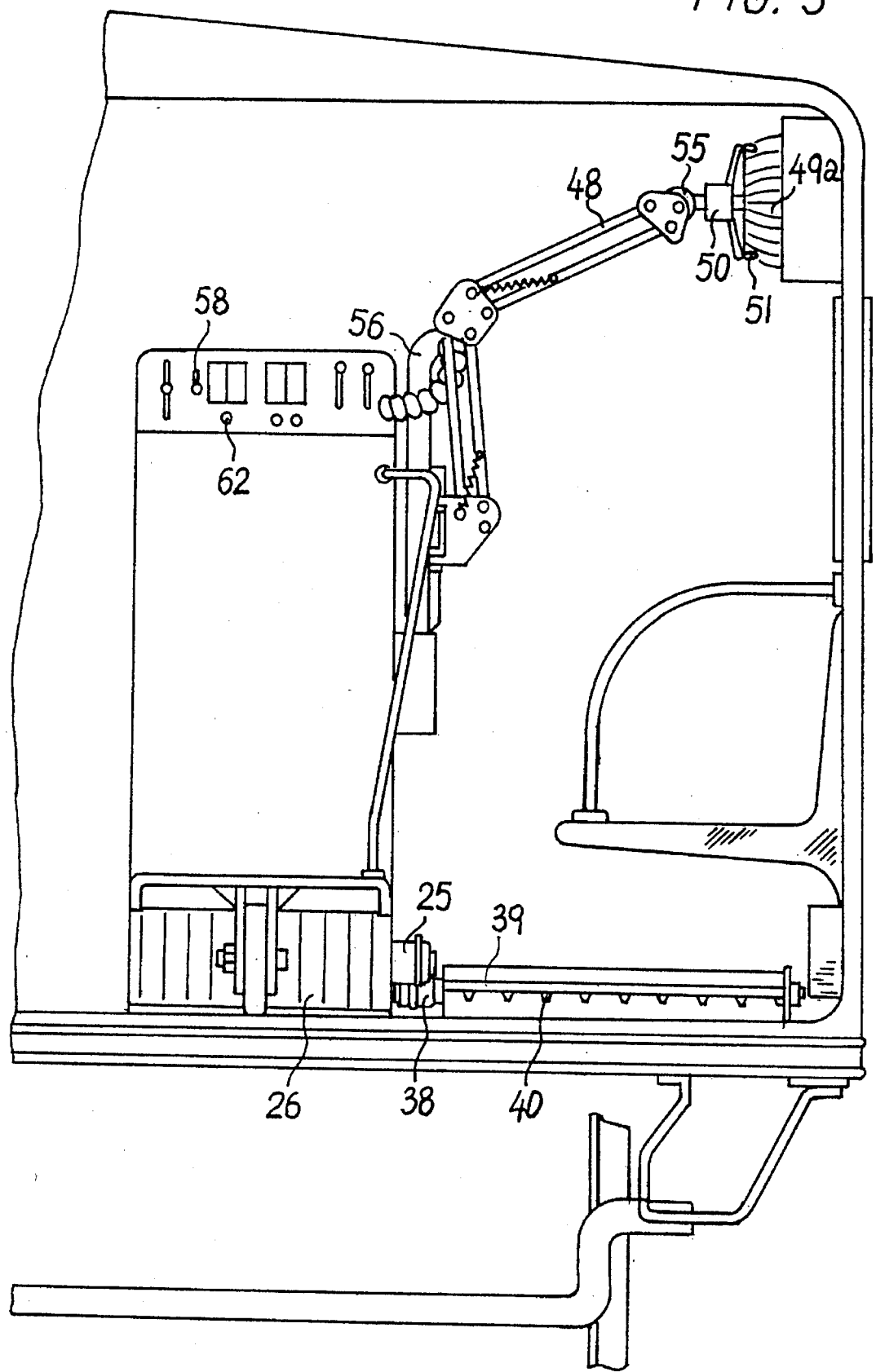
FIG. 3 is a view showing an operator position and various operational points of a side work mechanism during wall cleaning in accordance with a further embodiment of the present invention.

The operator manipulates the work mechanism 49 by a lever 53. For assuming a transportation position, the work mechanism 49 must be positioned in a gutter 54. The joint balls 55 shown in FIG. 3 provide extra freedom of movement for the work mechanism 49.

A fourth section has a light plastic pipe 56 with one end connected with a flexible hose 57 and another end connected with the air distributing valve 20 under the operator's panel. Through the air distributing valve 20 the hose 57 is connected with the filter 21 with the distributing valve 58 and the compressor system 34. Therefore, small debris and soiled liquid can be sucked into the tank, or air can be provided for drying off the cleaned surface. The second end of pipe 56 has a quick connecting element for special attachments, such as a hand-like structure for picking up relatively large garbage, such as paper,-bottles, cans, etc. With the help of this section the operator can clean the area under the seat and dry it off with the compressed air.

All elements for controlling and operating the systems of the machine are located under the operator's panel 12.

The compressor system 34 has a compressor 59, an electric motor 60, two air tanks 61 and the distributing valve 58. In order to control the air pressure in the system the operator's panel 12 is provided with a bottom 62 for turning on and off the electric motor 60.

A bracket 63 located at the front of the machine is provided with a quick connecting element for attaching additional structures. The piping connection of the compressor 34 with the tanks 41a allows to convey cleaning liquid to the operating mechanisms 23, 37, 49. The block for the dischargeable electrical batteries 14 are easy to install and remove. They supply power to all systems of the machine. They are easily installed and replaceable tanks for cleaning, disinfection and soiled liquids operate independently and are connected with the corresponding systems and mechanisms. The compressor 34 is driven by the electric motor 60 through belts and supplies air to the air tank 61 through the pipes and a regulating valve.

It is believed that the operation of the machine is clear from the description of its components. From the operator's control board the corresponding systems and mechanisms of the machine are actuated and perform their corresponding functions, and also the machine is moved in a desired direction.

When the machine is designed in accordance with the present invention, it has high efficiency, safety and maneuverability for cleaning and disinfecting interiors of such transportation vehicles as subway or other railroad cars, automobile trailers, and also can work in very limited space. The machine can clean floors, seats, walls, ceiling and cover windows of lighting fixtures of the cars in a short period of time.

It will be understood that each of the elements described above, or two or more together, may also find a useful application in other types of constructions differing from the types described above.

While the invention has been illustrated and described as embodied in a self-propelled machine for cleaning and disinfecting transportation vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A machine for cleaning and disinfecting transportation vehicles, comprising a frame provided with a plurality of wheels; electric motor means for driving said wheels and therefore moving the machine in a predetermined direction; a device for washing and cleaning a central area of the floor and under side seats of a transportation vehicle to be cleaned; and a device for washing and cleaning walls, seats and a ceiling of the transportation vehicle, said device for washing and cleaning the floor includes means for washing and cleaning a central area of the floor and means for washing and cleaning areas under the seats of the transportation vehicle, said device for washing and cleaning walls, seats, and ceiling being provided with lever means movable between a plurality of positions suitable for correspondingly cleaning the walls, the seats and the ceiling of the transportation vehicle.

2. A machine as defined in claim 1; and further comprising battery means operatable for supplying power to said electric motor means for moving the vehicle.

3. A machine as defined in claim 2; and further comprising electric motor means operating for driving said devices and supplied by said battery means.

4. A machine as defined in claim 2; and further comprising means for supplying cleaning and disinfecting liquids to corresponding areas of the transportation vehicle for washing and cleaning.

5. A machine as defined in claim 1; and further comprising suction means for withdrawing soiled cleaning and disinfecting liquids from the washed and cleaned areas of the transportation vehicle.

* * * * *